United States Patent
Sansone et al.

(10) Patent No.: US 7,376,313 B2
(45) Date of Patent: May 20, 2008

(54) LOW NOISE HIGH STRENGTH OPTICAL FIBER CABLES

(75) Inventors: Louis Sansone, Moosup, CT (US); Robert Hauptmann, Groton, CT (US)

(73) Assignee: Chesapeake Sciences Corporation, Millersville, MD (US)

( * ) Notice: Subject to any disclaimer, the term of this patent is extended or adjusted under 35 U.S.C. 154(b) by 0 days.

(21) Appl. No.: 10/909,191

(22) Filed: Jul. 30, 2004

(65) Prior Publication Data

US 2008/0095508 A1    Apr. 24, 2008

(51) Int. Cl.
 *G02B 6/44*    (2006.01)
(52) U.S. Cl. ............... 385/104; 385/100; 385/102; 385/109
(58) Field of Classification Search ......... 385/100–114
 See application file for complete search history.

(56) References Cited

U.S. PATENT DOCUMENTS

| 4,983,333 | A |   | 1/1991 | Blew |           |
|-----------|---|---|--------|------|-----------|
| 5,335,408 | A | * | 8/1994 | Cobb | 29/447    |
| 5,970,195 | A | * | 10/1999| Brown| 385/100   |

FOREIGN PATENT DOCUMENTS

EP    1115018    11/2001

* cited by examiner

*Primary Examiner*—Michelle Connelly-Cushwa
(74) *Attorney, Agent, or Firm*—Peloquin PLLC; Mark S. Peloquin, Esq.

(57) ABSTRACT

A method includes incorporating an optical fiber into a buffer tube, wherein the buffer tube has a first length. The buffer tube contains the optical fiber and a filler compound to create a buffer tube assembly. The buffer tube assembly is heated to an elevated temperature for a period of time, wherein the first length of the buffer tube decreases to a second length, such that extra optical fiber length is created relative to the second length. The buffer tube assembly is cooled to stabilize the second length and to retain the excess fiber length in the buffer tube.

24 Claims, 11 Drawing Sheets

$\Delta L = \frac{1}{2} \cos(\theta_0) \times (2 - \tan^2(\theta_0)) \times \Delta l$ $\Delta l$ = Tow Cable Strain $\Delta L$ = Optical fiber strain $\theta_0$ = Wrap angle of optical fiber

LOW NOISE HIGH STRENGTH OPTICAL FIBER CABLES

GOVERNMENT LICENSE RIGHTS

The U.S. Government has a paid-up license in this invention and the right in limited circumstances to require the patent owner to license others on reasonable terms as provided for by the terms of contract number N00024-00-C-6230 awarded by/under SBIR N98-001.

BACKGROUND OF THE INVENTION

1. Field of Invention

The invention relates generally to improving cables containing optical fibers, and more specifically to apparatuses and methods which are used to increase the mechanical load capacity of the cable and to decrease the optical system noise introduced through the cable.

2. Art Background

Cables are used in various industries to transmit optical signals from point to point over long distances. Optical fibers are a preferred transmission line in many cases due to the low signal attenuation presented by the optical path within the optical fiber. Such a cable can contain one or more optical fibers which provide transmission lines for the optical signals. Existing cable technology utilizes optical fibers, which are typically made from glass; a protective layer that houses the optical fiber, referred to as a "buffer tube;" and one or more layers that provide mechanical strength. The layers that provide mechanical strength are sometimes called "strength members" or the layers can contain "strength members." The strength members and buffer tube make the resulting cable robust (able to withstand axial or radial loading) and capable of surviving in environments that would otherwise damage the optical fiber and render the cable inoperable.

Current technology has focused on placing an optical fiber in a buffer tube such that the optical fiber is parallel to the buffer tube and therefore unbent. Such a parallel unbent configuration for the optical fiber provides the low attenuation characteristics mentioned above. Buffer tubes have been made from steel and are referred to in the art as "K" tubes. Additionally, buffer tubes made from plastics are known in the art. Current technology, whether employing steel or plastic buffer tubes, is focused on eliminating excess fiber length from the resulting buffer tube so that low attenuation results when optical signals travel in the optical fiber.

As mentioned above, optical fibers are made from glass. To ensure long life of the optical fiber, the stress experienced by the optical fiber during its working life should not exceed 25 percent of the proof test stress. Commercial grade optical fiber has a proof test stress of 100,000 pounds per square inch (psi) (equivalent to an elongation of approximately one percent) and high strength optical fiber has a proof test stress of 300,000 psi (equivalent to an elongation of approximately three percent). Thus, the maximum working elongation that an optical fiber can sustain spans the range of 0.25 to 0.75 percent. An optical fiber is subjected to additional elongation due to the elongation properties of a strength member incorporated into a cable.

Typical cables used to contain optical fibers and buffer tubes experience a non-recoverable increase in length referred to as "constructional slack" or "constructional elongation," which is typically removed during the first load cycle applied to the cable. The constructional elongation ranges from 0.2 to 0.6 percent for typical cable designs. Existing optical fiber/buffer tubes, incorporated into a cable that elongates during the first load cycle, experience a non-recoverable elongation that further reduces the elongation that the optical fiber can safely experience during its working life. As an example, an optical fiber that has a safe working elongation of 0.25 percent experiences a reduction of 0.2 percent due to the nonrecoverable release of constructional slack, resulting in only a 0.05 percent safe working elongation being available for working loads applied to the cable.

A variation on this example can occur if the cable experiences a nonrecoverable release of constructional slack of 0.6 percent. The elongation experienced by the optical fiber during the application of a load that produces a 0.25 percent strain in the cable will produce a 0.85 percent strain in the optical fiber. Such a state of strain will drastically shorten the life of the cable; this presents a problem.

Constrained by this problem, cables are over designed by necessity (from the perspective of the strength member) in order to keep the elongation experienced by the optical fiber to within a safe working limit (elongation resulting from application of 25 percent of proof test stress). Over designs of 10 to one or 20 to one are not uncommon in the telecommunications industry; this can present a problem.

Figure 1:
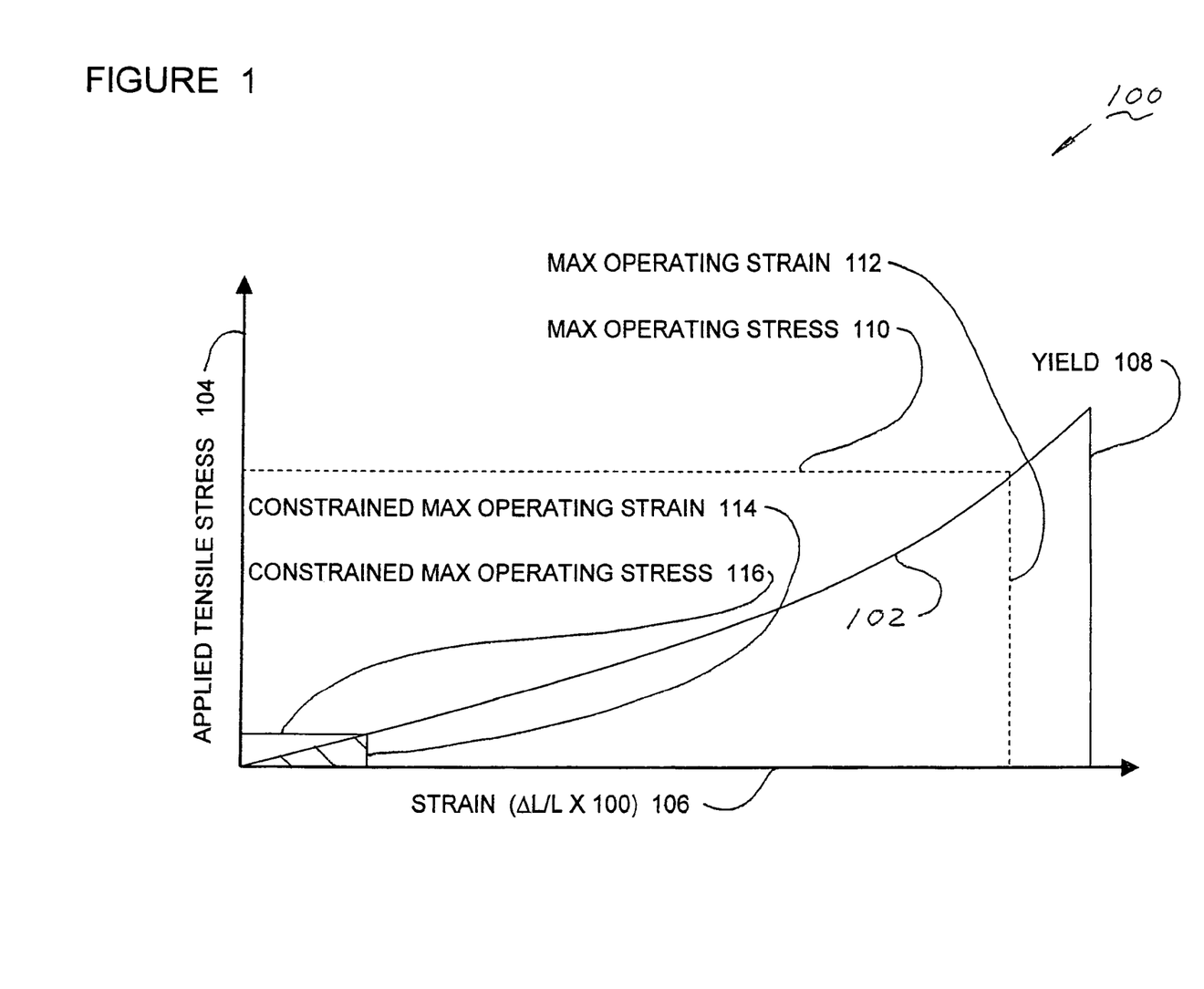
FIG. 1 illustrates a stress-strain curve for an existing cable.

FIG. 1 illustrates a stress strain curve for an existing cable generally at 100. For example, in the cable design illustrated in FIG. 1, the optical fiber can undergo a maximum working elongation of 0.1 percent (due to constructional elongation placing the optical fiber in a state of permanent prestress) and the cable can safely undergo a maximum working elongation of two percent (from a consideration of strength member limits). Referring to FIG. 1, stress is plotted on the vertical axis at 104 and strain is plotted on the horizontal axis at 106, the resulting stress-strain curve is indicted at 102. The maximum safe working stress (as governed by the strength members) is indicated at 110 and is equivalent to a load of 20,000 pounds. The strain corresponding to the maximum working stress is indicated at 112 and is equal to two percent, in this example, where ΔL is a change in length of a gauge length L. Cable yield is indicated at 108. Stresses and strains indicated on the figures, including FIG. 1 are not to scale, these values are plotted for illustrative purposes only; therefore, absolute values should not be inferred from any of the figures.

The constrained maximum operating stress that the optical fiber can safely withstand is indicated at 116 (equivalent to an applied load of 1,000 pounds) and the corresponding constrained maximum strain is indicated at 114, 0.1 percent, in this example. Inspection of the stress/strain curve 102, between 114 and 112, indicates that a majority of the mechanical strength available in this cable design cannot be realized in practice due to the constraint imposed by the existing configuration of the optical fiber contained within.

Existing metal K tubes provide a further limitation to the applied load and plastically deform when the applied load produces a strain of 0.6 percent in the K tube. Regardless of the material used for the buffer tube, metal or plastic, current constructions of buffer tubes and optical fibers necessitate the use of a substantial amount of strength member in a cable design such that the resulting cable must be operated at only a fraction of its maximum working load (as governed by the strength member) in order to prevent damage to the optical fiber. In conjunction with the existing optical fiber/buffer tube, strength members have been made out of metallic elements such as steel.

In other applications of cables incorporating optical fibers, such as neutrally buoyant cables or small diameter cables, such mechanical over design and use of metallic strength members are not feasible. Synthetic strength members can be utilized to reduce the total cable weight. Synthetic strength members loaded to 50 percent of their breaking strength can elongate approximately from 1.2 to 1.7 percent during the application of a working load. Added to the working load elongation is the constructional elongation of 0.2 to 0.6 percent resulting in a total elongation range that an optical fiber must endure of 1.4 to 2.3 percent in order to fully utilize the full load carrying capacity of a cable. Such an elongation range places the working elongation of the optical fiber above the safe limit described above; this presents a problem.

The cables described above, incorporating optical fibers, can be used in interferrometric optical systems, wherein small differences in path length (synonymous with small changes in optical phase) are important. Such interferrometric systems are sensitive to changes in path length that equate to strain on the order of $1 \times 10^{-13}$ In such systems, it has been found that existing cable designs are sensitive to mechanical excitations, such as stress, vibration, etc.; this presents a problem.

Cables that incorporate optical fibers are also used as optical fiber hookup cables, where an optical connection is made between a first point and second point. Such hookup cables must be flexible, sustain loads applied in both the axial and radial directions, and in some cases be insensitive to environmentally born mechanical excitations such as vibration, stress, etc. Existing cable constructions present problems to this type of use for the reasons discussed above.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described to allow a cable, containing an optical fiber, to achieve its full mechanical design potential while maintaining low attenuation of the optical signal and decreasing an associated optical system's susceptibility to mechanically induced noise. In various embodiments, extra optical fiber length is incorporated into a cable relative to the cable length. The extra optical fiber length permits the cable to elongate up to its full elongation limit without straining the optical fiber beyond its safe working elongation limit. In one embodiment, high numerical aperture optical fiber is incorporated into a buffer tube so that extra fiber length exists within the buffer tube.

Figure 2:
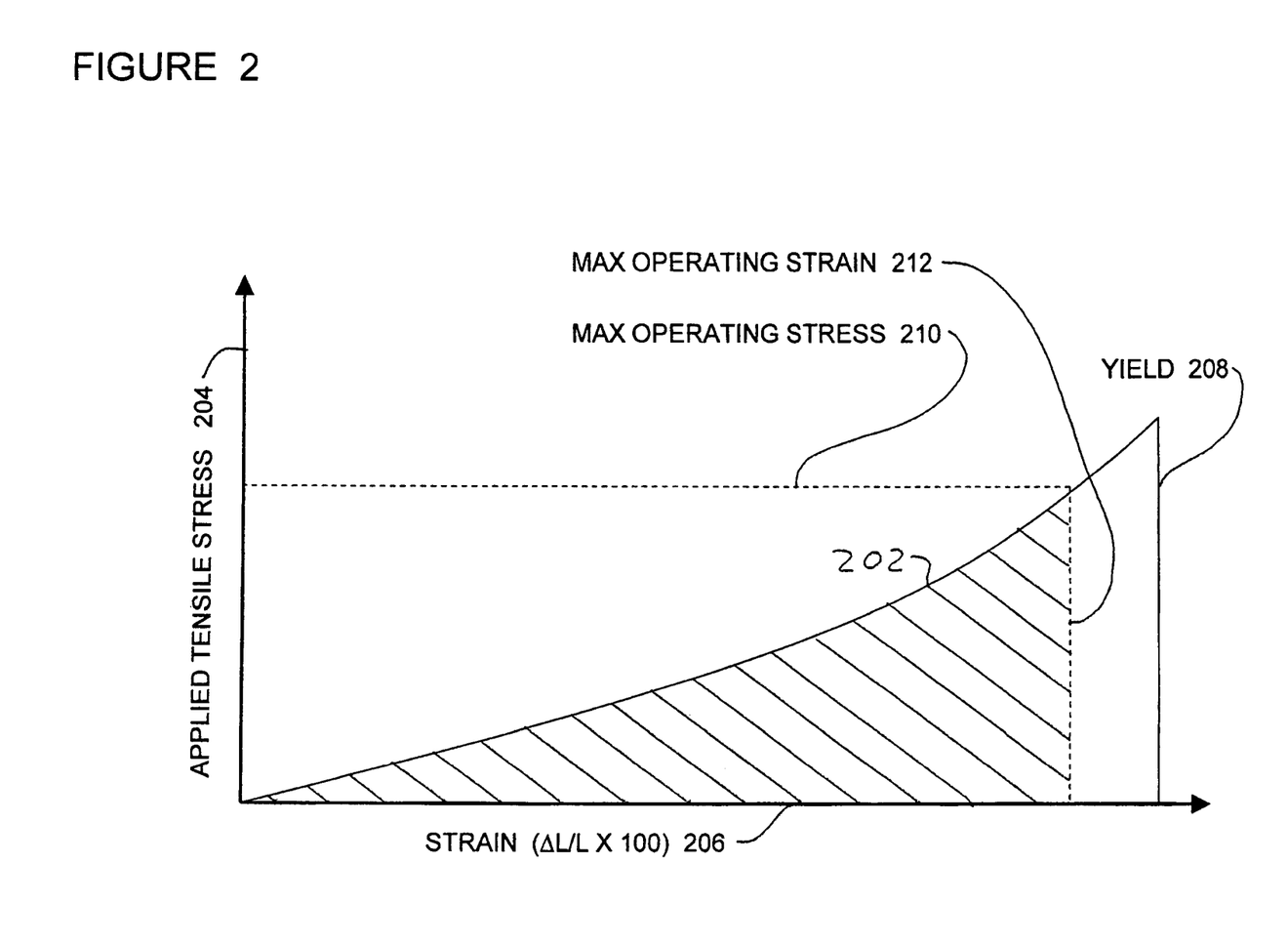
FIG. 2 illustrates stress strain behavior for a cable designed according to one embodiment of the invention.

FIG. 2 illustrates stress-strain behavior, generally at 200, for a cable designed according to one embodiment of the invention. With reference to FIG. 2, applied tensile stress is indicated at 204, a corresponding strain is indicated at 206 and a stress strain curve for the cable is indicated at 202. Cable yield is indicated at 208. For ease of comparison, a working maximum mechanical load for the cable of FIG. 2 is similar to the working maximum mechanical load for the cable of FIG. 1. In both cases, the maximum working load is nominally 20,000 pounds. Extra fiber length is incorporated into the cable of FIG. 2 so that the safe working elongation limit of the cable (typically one to two percent) does not place the optical fiber into a strain that exceeds the optical fiber's safe working elongation limit, typically 0.25 percent for normal commercial optical fiber and 0.75 percent for high strength optical fiber. The constraint imposed by the optical fiber (FIG. 1) has been eliminated from the cable design of FIG. 2; thereby achieving full performance of the mechanical cable design. In this example, full performance of the mechanical cable design is indicated at 210 and is nominally 80 percent of the yield stress of the cable. Other cable designs will have different yield stresses, maximum working stresses, and corresponding maximum working load limits. In various embodiments, the present invention incorporates sufficient extra optical fiber length to allow the full mechanical performance of a cable design to be realized.

Figure 3:
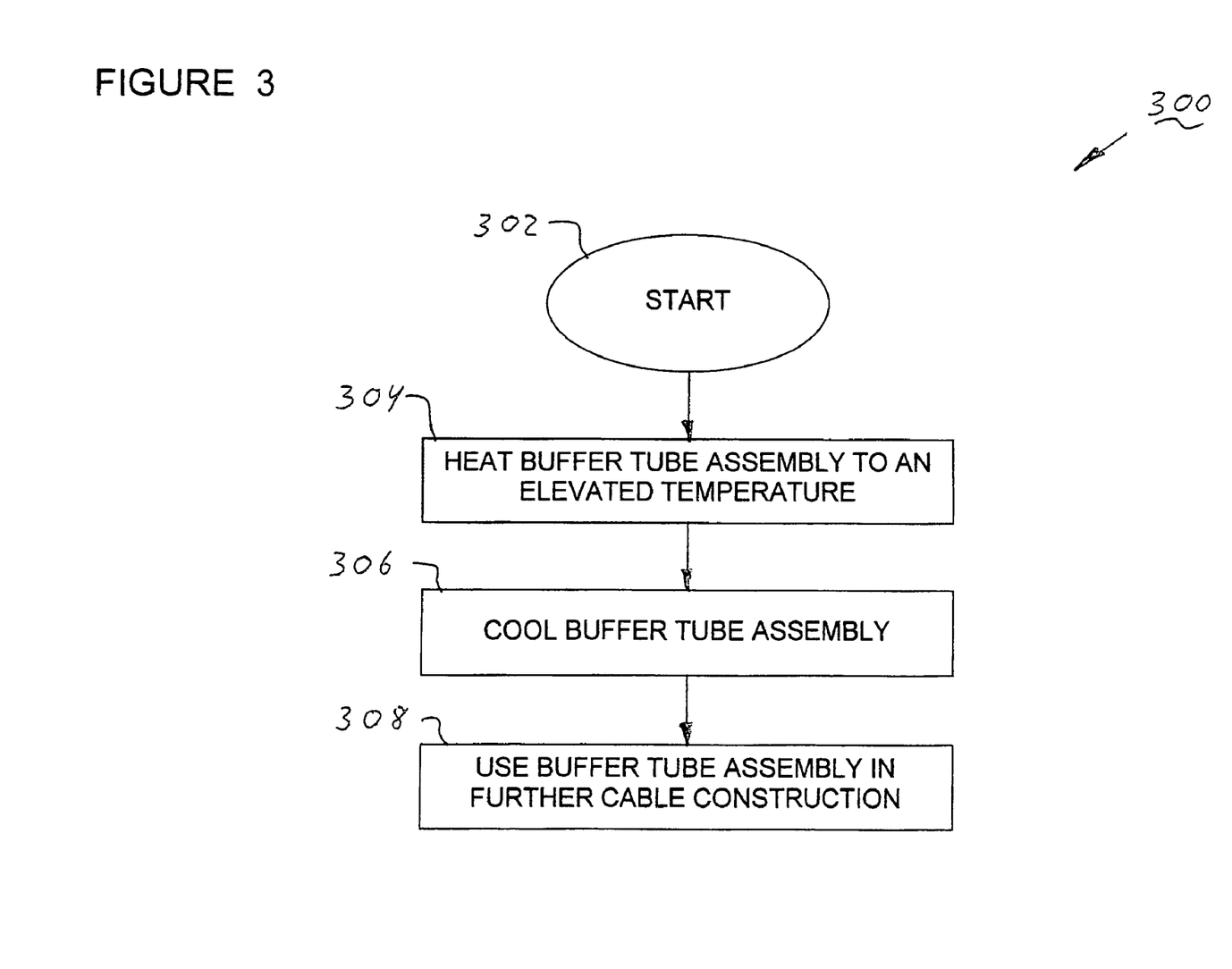
FIG. 3 illustrates a method for creating excess fiber length according to one embodiment of the invention.

FIG. 3 illustrates a method for creating excess fiber length according to one embodiment of the invention. With reference to FIG. 3, a method is illustrated generally at 300. The method starts at 302 with a length of buffer tube assembly. The buffer tube assembly contains a length of optical fiber, $L_f$, disposed within a buffer tube along with a filler compound. Existing buffer tubes assemblies are made utilizing commercial processes that produce the buffer tube assembly without extra fiber length or with a minimum amount of extra fiber length. At block 304, a first length of buffer tube assembly is loosely coiled and heated. Upon heating, the buffer tube assembly decreases in length or shrinks to a second length, $L_{bt}$; thereby, compressing the optical fiber contained therein to create extra fiber length within the buffer tube. After shrinking, $L_f$ is greater than $L_{bt}$. In one embodiment, the buffer tube assembly is heated with hot water. In one embodiment, the buffer tube assembly is heated for five minutes with water raised to the boiling point. In another embodiment, the buffer tube assembly is heated with hot air. In yet another embodiment, the buffer tube assembly is heated with a liquid. In another embodiment, the buffer tube is heated with a source of heat configured to provide radiation heat transfer. Various configurations of buffer tube assemblies will require heat to be applied for various amount of time in order to trigger shrinkage within the buffer tube; the present invention is not confined to a particular method for heating or time for the application of heat to the buffer tube assembly.

At block 306 the heated buffer tube assembly is cooled to stabilize the second length of the buffer tube assembly at or close to $L_{bt}$. In one embodiment, the buffer tube assembly is cooled with a cold fluid such as an ice water bath. In another embodiment, the buffer tube assembly is cooled with a liquid at 40 degrees Fahrenheit. In yet another embodiment, the buffer tube assembly is cooled by placing the buffer tube assembly in a refrigerated space. In various embodiments, the buffer tube assembly is cooled following heating and shrinkage to stabilize the second length. Accordingly, embodiments of the present invention are not limited by the way in which the buffer tube assembly is cooled and/or the length of time that the buffer tube assembly is maintained in the cooled state.

The process of heating at block 304 and cooling at block 306 creates extra optical fiber length relative to a length of buffer tube. In the example given above, $L_f$ is greater than $L_{bt}$. The amount of extra fiber length in the finished buffer tube assembly can be controlled by the selection of material for the buffer tube. In particular, a buffer tube material is selected for its ability to shrink, which is in contrast to the current practice in the art that selects a buffer tube material to prevent or minimize processing or post processing shrinkage. In various embodiments, the buffer tube is made out of a thermoplastic elastomer, a polyvinylidene fluoride (PVDF), a plastic or a thermoplastic. In one embodiment, the PVDF material is Atochem®#31508, which provides shrinkage of two to three percent. In another embodiment, the thermoplastic elastomer is Hytrel® from DuPont®, which provides shrinkage of approximately five percent.

At block 308, according to various embodiments of the invention, the buffer tube assembly is incorporated into a cable with the application of a strength member, electrical conductors, and jacket (depending on the cable design) to produce a cable capable of being loaded to the full mechanical load range of the cable without an elongation constraint being imposed by the optical fiber. In one embodiment, high numerical aperture (NA) optical fiber is used in the buffer tube assembly to prevent attenuation of the optical signal that may occur due to bends sustained by the optical fiber during the process described above.

Figure 4:
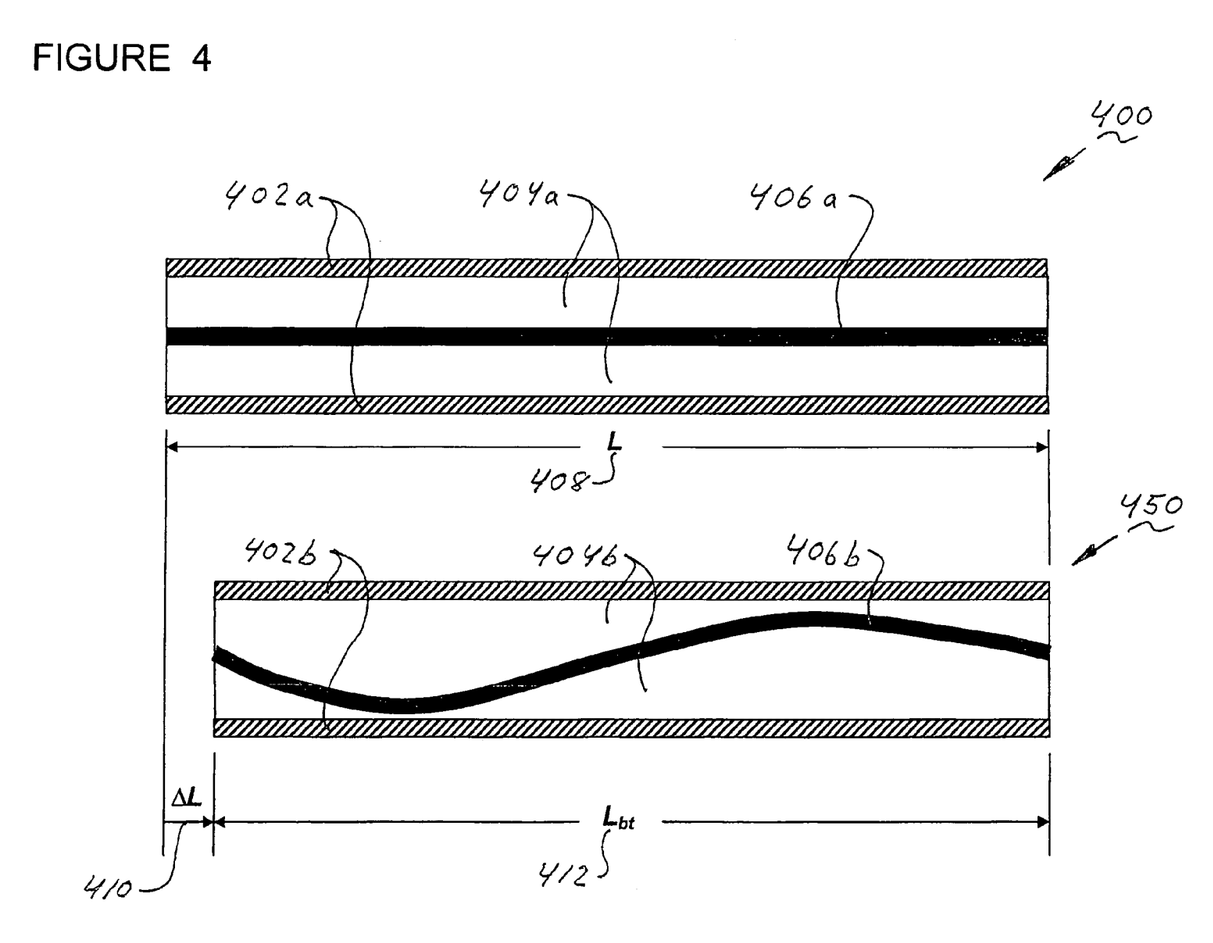
FIG. 4 depicts two cross-sectional views of buffer tube assemblies, corresponding to the process blocks of FIG. 3, according to one embodiment of the invention.

FIG. 4 depicts two cross-sectional views of buffer tube assemblies, corresponding to the process blocks of FIG. 3, according to one embodiment of the invention. With reference to FIG. 4, a cross-sectional view of a buffer tube assembly is indicated at 400. A buffer tube is indicated at 402a. A fill material is indicated at 404a and an optical fiber is shown at 406a. Such a cross-sectional view, 400, is indicative of the buffer tube assembly at the start of the process previously described at block 302 (FIG. 3). A length of the buffer tube and nominally the optical fiber too is indicated as L at 408. In one embodiment, the outer diameter of the buffer tube 402a is 0.044 inch and the inner diameter is 0.030 inch. In one embodiment, the optical fiber 406a is single mode commercial grade telecommunications fiber, with an outer diameter of approximately 0.005 to 0.007 inch or approximately 80 micron. In another embodiment, the optical fiber 406a is a high numerical aperture (low bend loss) grade of optical fiber. In yet other embodiments, the optical fiber can be a multimode optical fiber; however, those of skill in the art will appreciate that the attenuation characteristics of a multimode optical fiber may impose a limitation on the length of optical fiber that can be so employed.

In one embodiment, the fill material 404a is a gel, made from a mixture of Cabosil and NyOil™ or other suitable materials. The fill material is generally flexible, providing a medium with which the optical fiber is both held back from "pistoning" out of an end of the buffer tube assembly, while allowing the optical fiber to assume a curved shape as the buffer tube assembly contracts during processing as described above in conjunction with FIG. 3.

During the heating process at block 304 (FIG. 3) the buffer tube 402a decreases in length, from the length 408 (L) as is indicated by arrow 410 in FIG. 4 to a second length, $L_{bt}$, at 412. The optical fiber 406a, formerly mostly straight, now assumes the curved shape as indicated at 406b after the buffer tube assembly decreases in length (cross-sectional view 450). A fill material 404b is soft enough to allow the optical fiber 406a to assume a shape roughly indicated at 406b. Those of skill in the art will recognize that the sinusoidal shape (amplitude and wavelength) illustrated at 406b is merely approximate in nature and is not meant to be a precise definition of the shape the optical fiber assumes after the buffer tube assembly decreases in length. In general, an optical fiber will assume a curved shape after the buffer tube assembly decreases in length, with the amplitude and wavelength of the shape being influenced by the mechanical properties of the optical fiber, the mechanical properties of the fill material and the geometry of the buffer tube.

Figure 5:
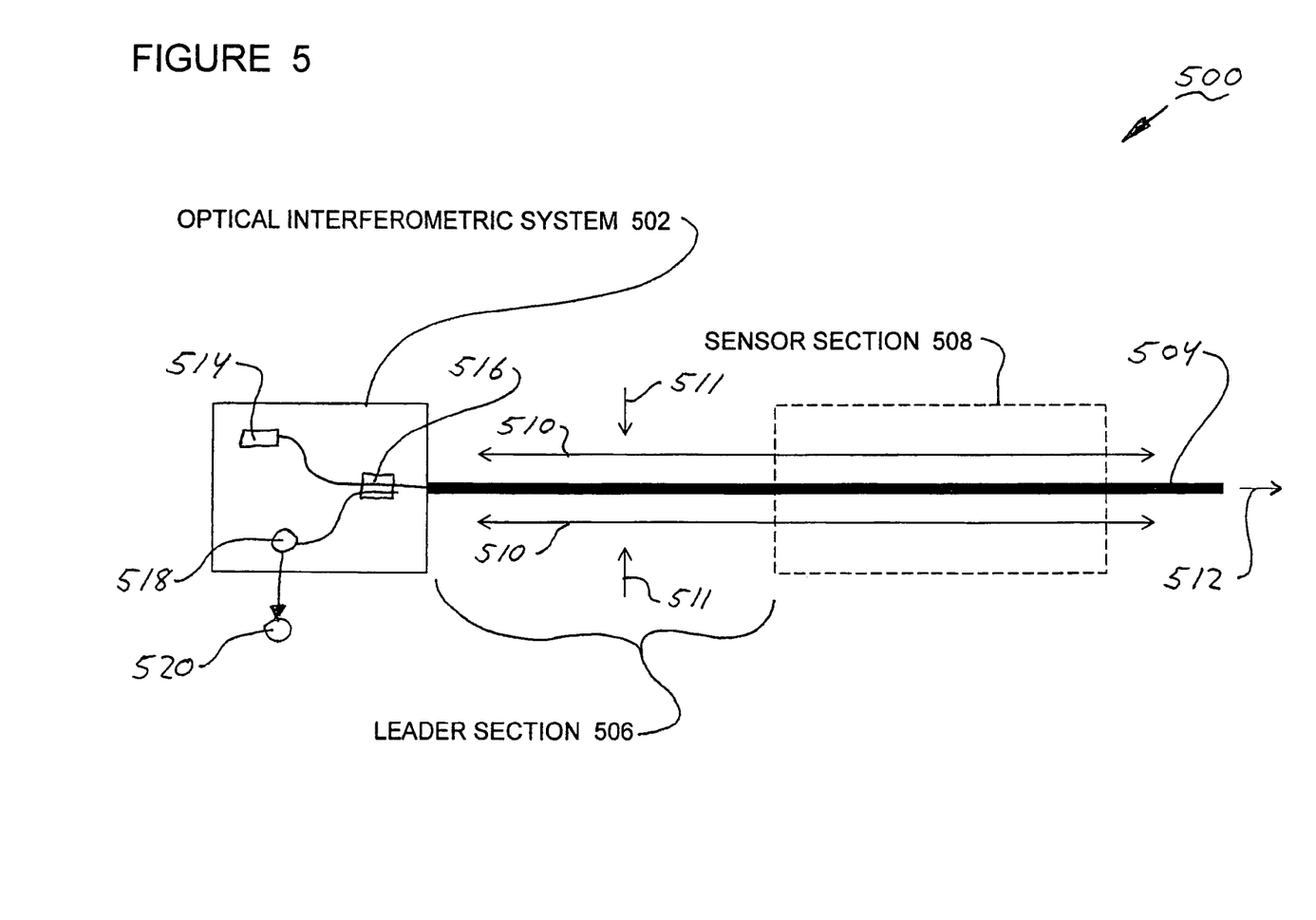
FIG. 5 illustrates an optical system configured with a cable according to one embodiment of the invention.

FIG. 5 illustrates, generally at 500, an optical system configured with a cable according to one embodiment of the invention. With reference to FIG. 5, an interferometrically based optical system 502 is connected with a cable 504. The cable 504 contains one or more buffer tubes with optical fibers as previously described. A source of light, such as a laser 514, illuminates the attached optical fibers within cable 504 with an incident optical signal. The incident optical signal interacts with the optical fibers contained in cable 504 as well as with sensors which can be contained in a sensor section of the cable indicated by 508, in some embodiments, causing a reflected signal to be generated which is responsive to the incident optical signal. A coupler 516 permits the reflected optical signal to be sensed and directed to a photodetector indicated at 518. The photodetector 518 converts the optical signal to an electrical signal that can be measured with test equipment at 520. Those of skill in the art will recognize that other components, such as a reference leg of optical fiber, mixers, amplifiers, etc., have not been included in the figure so that the presentation and discussion of embodiments of the invention are not unduly cluttered.

In one or more embodiments, the cable 504 passes through environmental excitations that produce strains in the cable 504. Such excitations are indicated by 510; these excitations can be the result of shear stresses applied by moving fluids, etc. Radially applied loads are indicated at 511 and a tension is indicated at 512. The loads, 510, 511, and 512 can be applied at a point location or they can be distributed along a length of the cable 504. Application of the loads can be an undesired result, such as tow induced vibrations, or the applied load can be a desired result, such as a tension induced in a cable when a force is applied to suspend a cable. Those of skill in the art will recognize other loading scenarios; the embodiments of the present invention are not limited by the type of load applied or the extent of the region of application of the load.

Such excitations described above manifest as a strain induced in an optical fiber contained within the cable 504. In an interferometric optical system, a strain in an optical fiber increases the optical path length, relative to the unstrained reference leg, which results in a signal (in one embodiment, a change in phase is measured). Unwanted path length changes, due to the aforementioned environmentally induced strains, also produce phase changes which are false signals or noise. Embodiments of the present invention reduce the noise of such systems by reducing a system's susceptibility to phase noise introduced by such environmentally induced excitations of the optical fibers contained within the cable 504. One example of such a reduction in system noise is illustrated below in conjunction with FIG. 6.

Figure 6:
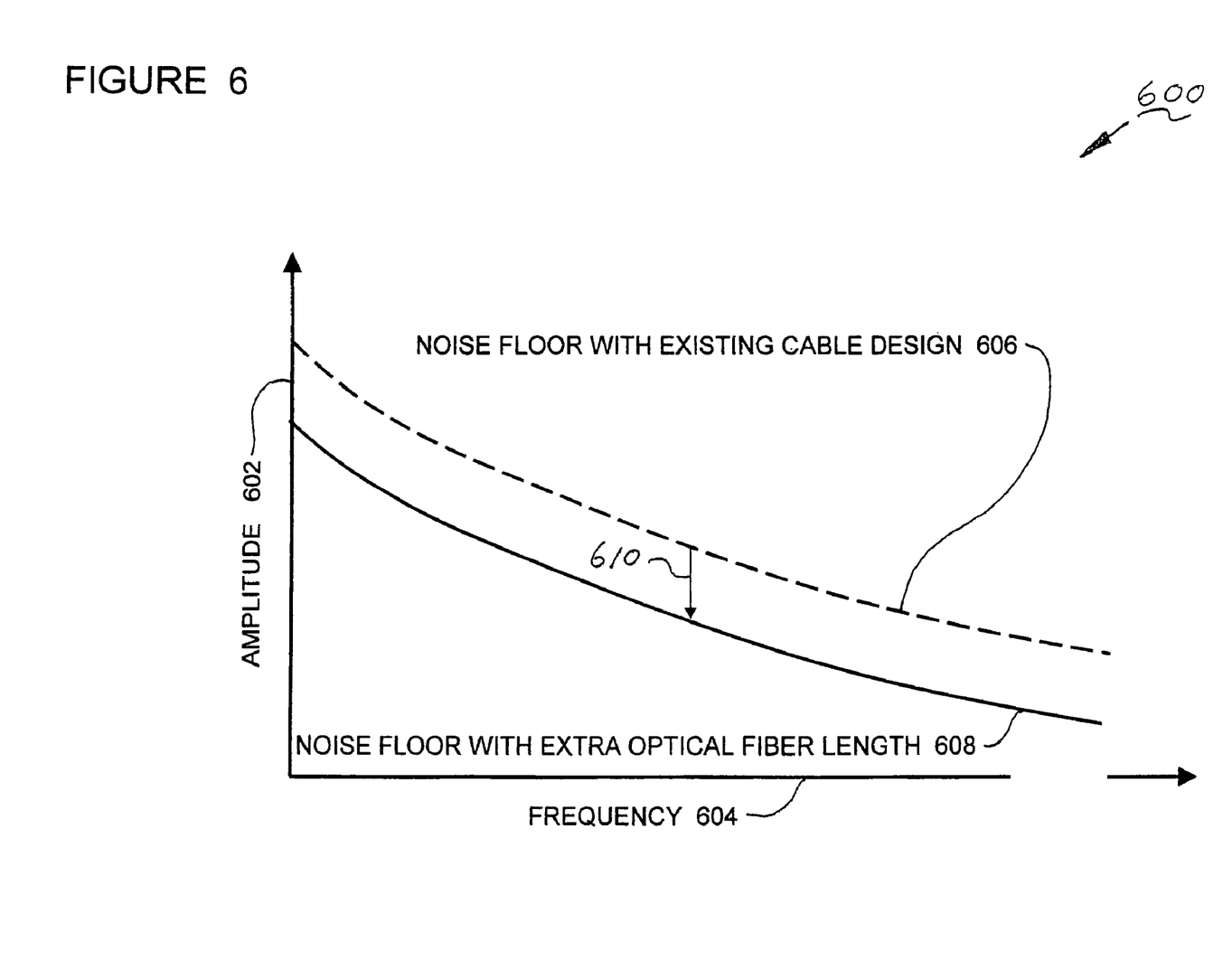
FIG. 6 shows a reduction in phase noise according to one embodiment of the invention.

FIG. 6 shows a reduction in phase noise according to one embodiment of the invention. With reference to FIG. 6, a comparison of optical system noise is shown generally at 600 for two different cables. System output is indicated on the vertical axis at 602 and frequency is indicated on the horizontal axis at 604. In the comparison presented in FIG. 6, the optical carrier frequency has been removed and a side band is shown therein. In the comparison of FIG. 6, both measurements 606 and 608 are performed with the same optical system 502 (FIG. 5) and the same environmental excitation field excites both cables.

A noise floor, indicative of an existing cable that does not contain extra fiber length or contains a nominal amount of extra fiber length, is shown as curve 606. Such an existing cable is exemplified by FIG. 1 above, the cross section of which is exemplified by the cross-sectional view presented at 400 (FIG. 4). In this measurement, an appreciable amount of environmentally induced phase noise has influenced the system noise floor.

Curve 608 represents a measurement of system output (at 520 FIG. 5) for a cable that has extra fiber length incorporated into the cable design as described in conjunction with the figures above. In one embodiment, for the same excitation conditions, the amplitude of the curve 608 is 300 times smaller than the amplitude of the curve 606. An arrow 610 indicates a reduction in system noise from the curve 606 to the curve 608.

According to various embodiments of the invention, an optical fiber is desensitized to environmentally induced excitations, an embodiment of which has been described in conjunction with FIG. 6. Examples of such excitations are, but are not limited to; strum induced vibrations from vortex shedding when a cable travels at an angle of attack relative to a fluid; a cable suspended from point to point or at several points along its length excited by fluid motion such as wind or waves; a cable buried in the ground that experiences strain due to the motion of the ground or movement at the surface of the ground. Excitations to cables containing optical fibers can occur during other uses of such optical fibers, as in hook-up cables used to connect pieces of optical equipment together.

Figure 7:
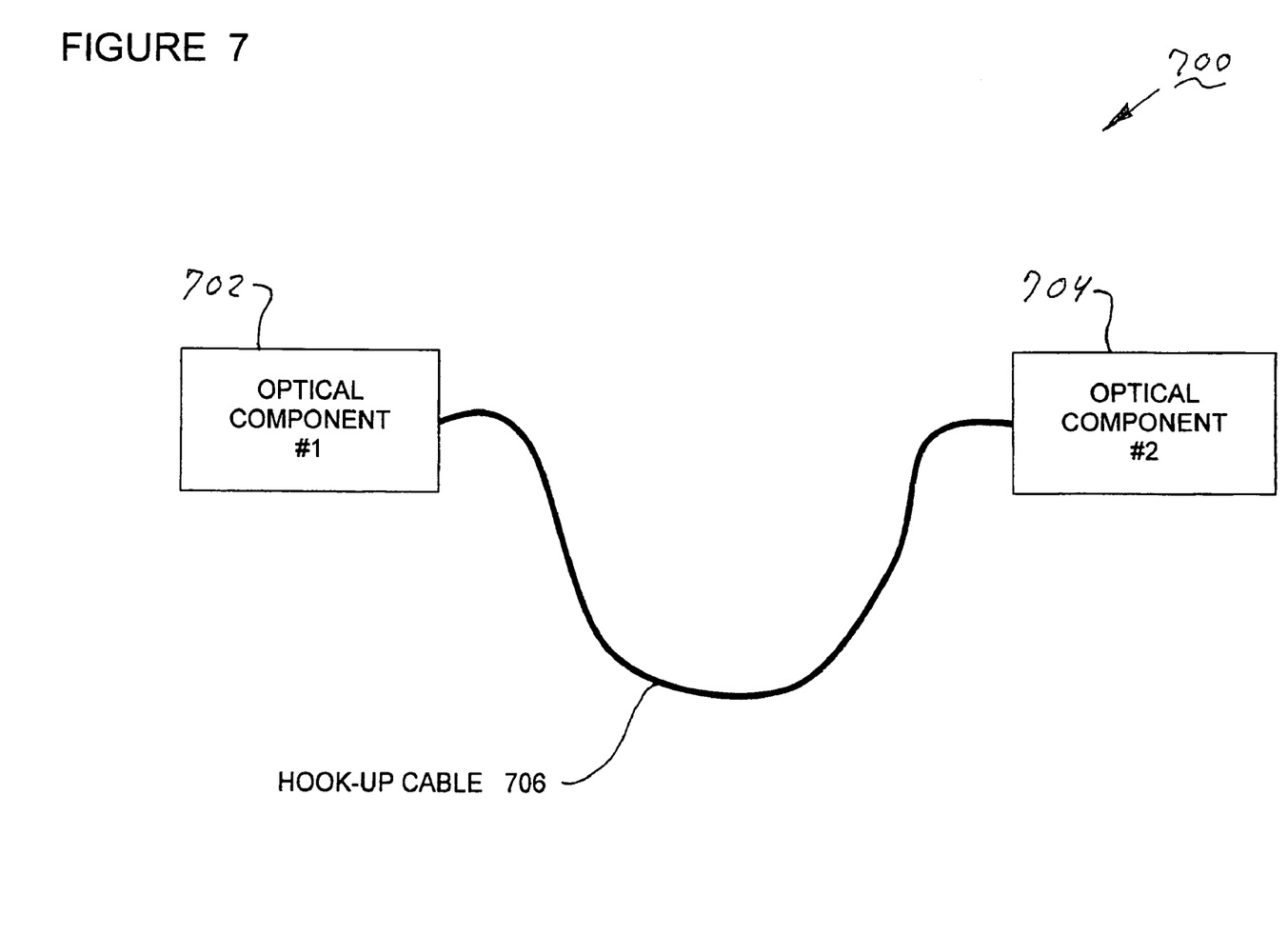
FIG. 7 illustrates a hookup cable according to one embodiment of the invention.

FIG. 7 illustrates a hookup cable, generally at 700, according to one embodiment of the invention. With reference to FIG. 7, a first optical component is indicated at 702, a second optical component is indicated at 704, and a hook-up cable 706 connects the first component 702 to the second component 704. In one embodiment, the hook-up cable 706 is made using a buffer tube assembly, which is processed as described above in conjunction with the preceding figures to incorporate extra fiber length into the buffer tube assembly. The hook-up cable is not susceptible to environmentally induced excitations. Environmentally induced excitations imparted to a hook-up cable can include human handling, fluid excitation, such as wind and waves, vibrations such as fan generated vibration, etc. The hook-up cable 706 isolates the optical fiber from the strains induced by these excitations.

Figure 8:
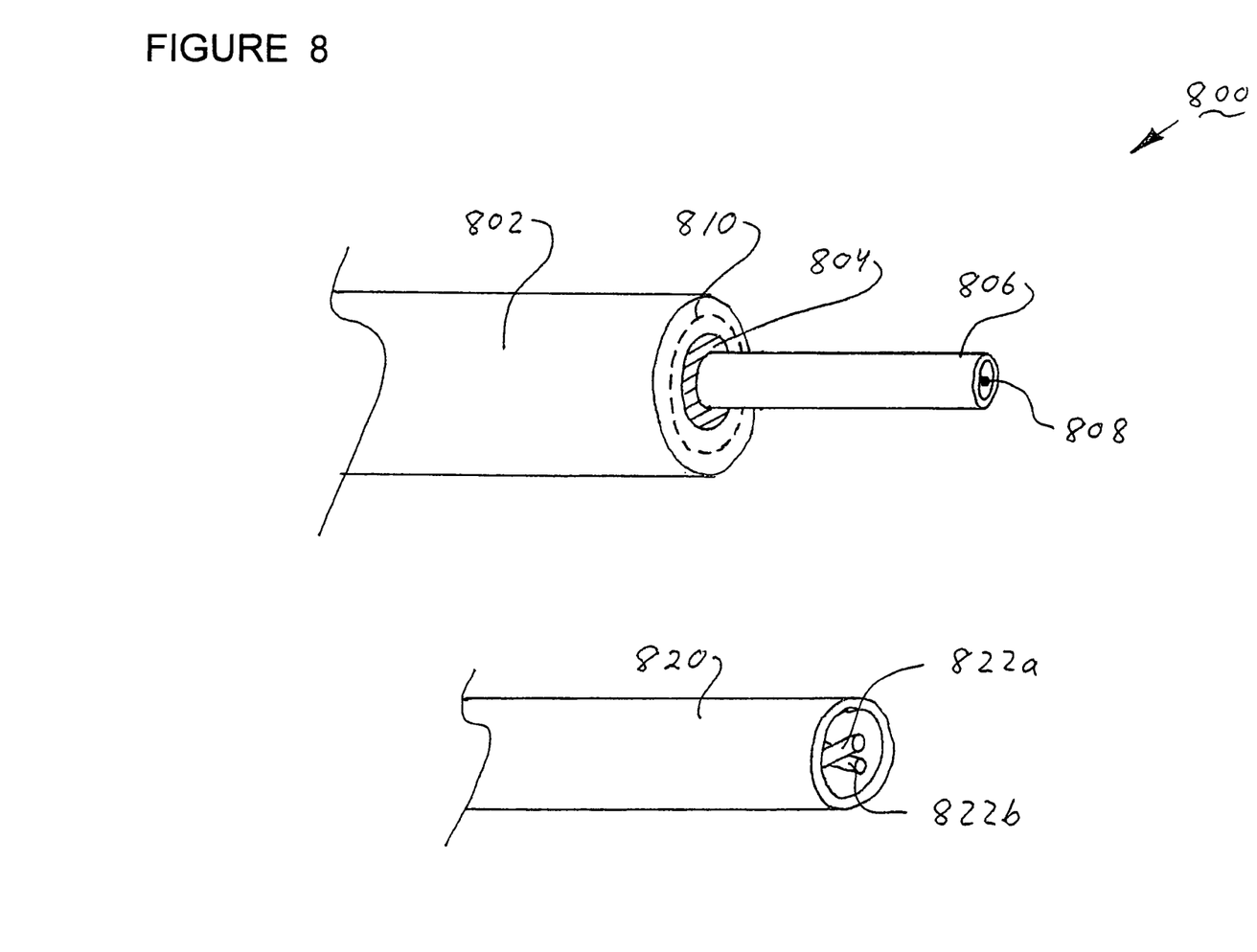
FIG. 8 shows a cable having an optical fiber oriented at a zero degree wrap angle according to one embodiment of the invention.

FIG. 8 shows a cable having an optical fiber oriented at a zero degree wrap angle according to one embodiment of the invention. With reference to FIG. 8, a cable is illustrated generally at 800. A buffer tube assembly 806 is placed on the longitudinal axis of the cable. The buffer tube assembly 806 includes an optical fiber 808, a filler material, and a buffer tube as previously described above in conjunction with the preceding figures. The optical fiber 808 can be made from a commercially available fiber such as the Corning® SMF-28™ optical fiber (125 µm diameter), or a high numerical aperture optical fiber can be used. In one embodiment, a strength member layer 804 is disposed over the buffer tube assembly 806. In one embodiment, the strength member layer is made from one or more synthetic fibers, such as, Kevlar®, Vectran®, polyester yarn, carbon fiber, or another high strength element. Embodiments of the present invention are not limited by the presence or lack of the strength member 804 or the type of strength member used in a cable design. In one embodiment the buffer tube provides the function of a strength member.

In one or more embodiments, a protective jacket 802 encapsulates the strength member 804 and the buffer tube assembly 806. The jacket 802 can be made from a variety of materials, such as but not limited to, High Density Polyethylene (HDPE) polyurethanes, irradiated cross-linked materials, etc. Embodiments, of the present invention are not limited by the type of jacket material used for 802. In one or more embodiments, the buffer tube performs the function of the jacket 802.

In one embodiment, a strength member can be added to the jacket 802 as indicated by the dashed line at 810. Addition of a strength member to the jacket increases the penetration resistance of the jacket and can prevent an object from cutting through the jacket 802.

In one or more embodiments, a plurality of optical fibers (822a and 822b) can be disposed within a buffer tube, such as a buffer tube 820. The plurality of optical fibers can be arranged parallel to the buffer tube or the optical fibers can be twisted together at a wrap angle. Orientation of a buffer tube assembly at a wrap angle other than zero degrees can be used in conjunction with the teachings presented herein to introduce additional extra optical fiber length into a cable incorporating optical fibers. Such an orientation is described below in conjunction with FIG. 9.

Figure 9:
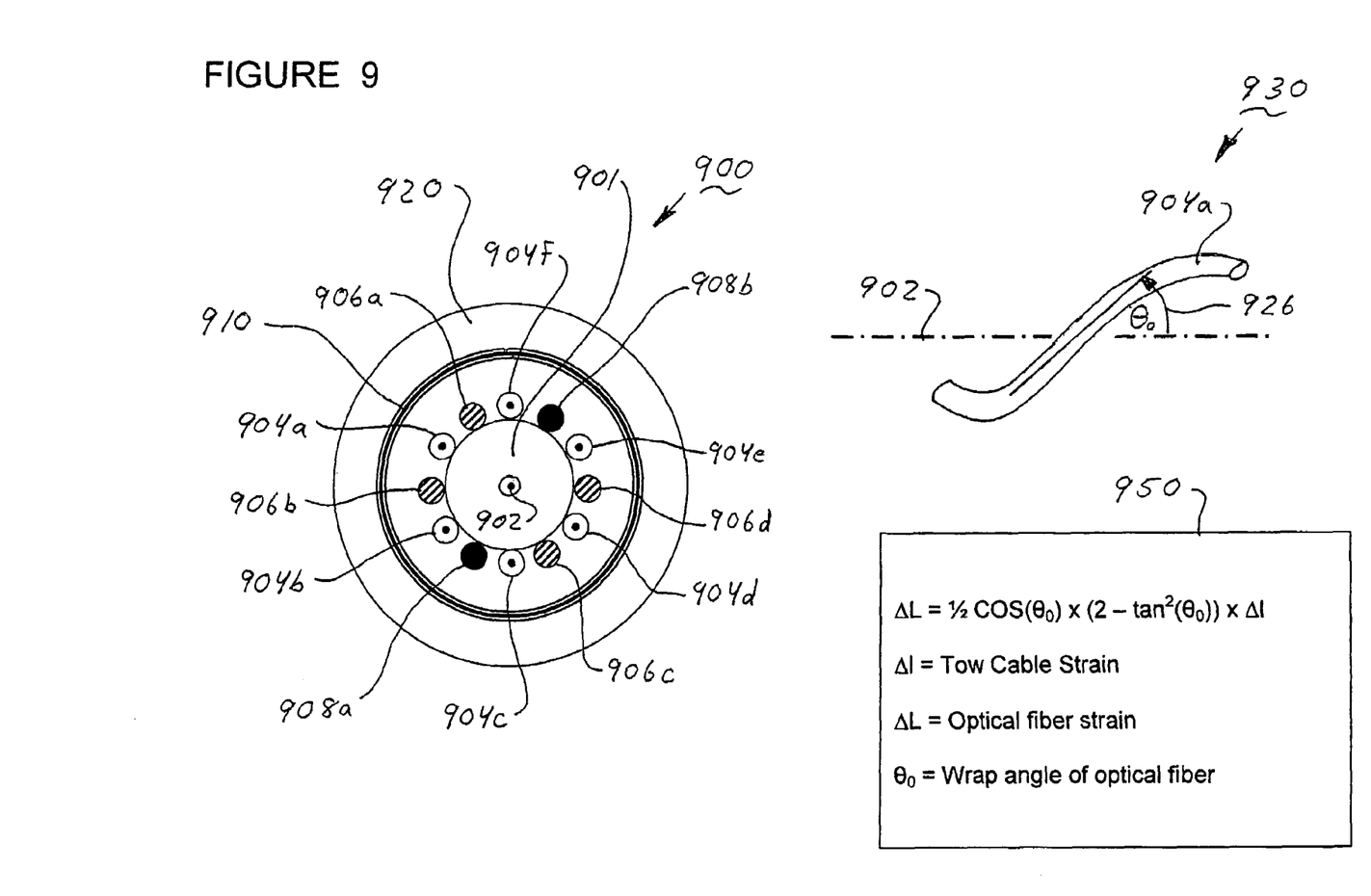
FIG. 9 illustrates a cable having optical fibers wrapped at a non-zero wrap angle according to one embodiment of the invention.

FIG. 9 illustrates a cable having optical fibers wrapped at a non-zero wrap angle according to one embodiment of the invention. With reference to FIG. 9, a cross-sectional view of a cable incorporating a plurality of buffer tube assemblies wrapped at a positive wrap angle is shown at 900. In the embodiment, shown at 900, six buffer tube assemblies, 904a, 904b, 904c, 904d, 904e, and 904f are wrapped around the central axis 902 of the cable shown at 900. Shown at 930, is a wrap angle $\theta_0$ at 926 as illustrated between the central axis 902 and the buffer tube assembly 904a. Electrical conductors 906a, 906b, 906c, and 906d as well as other elements 908a, and 908b are wrapped at the wrap angle $\theta_0$ to form a layer of the cable over a central filler 901. The wrap angle $\theta_0$ can range from approximately zero degrees to approximately 60 degrees depending on the desired degree of cable flexibility. Typically, wrap angles range from 10 degrees to 60 degrees, with 54.6 degrees representing a wrap angle that will produce a zero strain along the 54.6 degree direction if the poison ratio of the underlying cable material is equal to 0.5. The equation for strain as a function of wrap angle is given at 950. An optical fiber such as a high numerical aperture fiber (low bend loss) optical fiber can be used in the buffer tube assemblies 904a through 904f. In various embodiments, metal can be used for the buffer tube material when the strain imparted to the buffer tube stays within the elastic limit of the metal used for the buffer tube. Additionally, more than one optical fiber can be disposed within a buffer tube after the example shown in FIG. 8.

A strength member layer 910 can be made from a variety of high strength members such as, Kevlar®, Vectran®, polyester yarn, carbon fiber, or another high strength element (described above). In one embodiment, a jacket 920 is disposed over the strength member layer 910. The jacket can be made from a variety of materials, such as but not limited to, High Density Polyethylene (HDPE) polyurethanes, irradiated cross-linked materials, etc.

Figure 10:
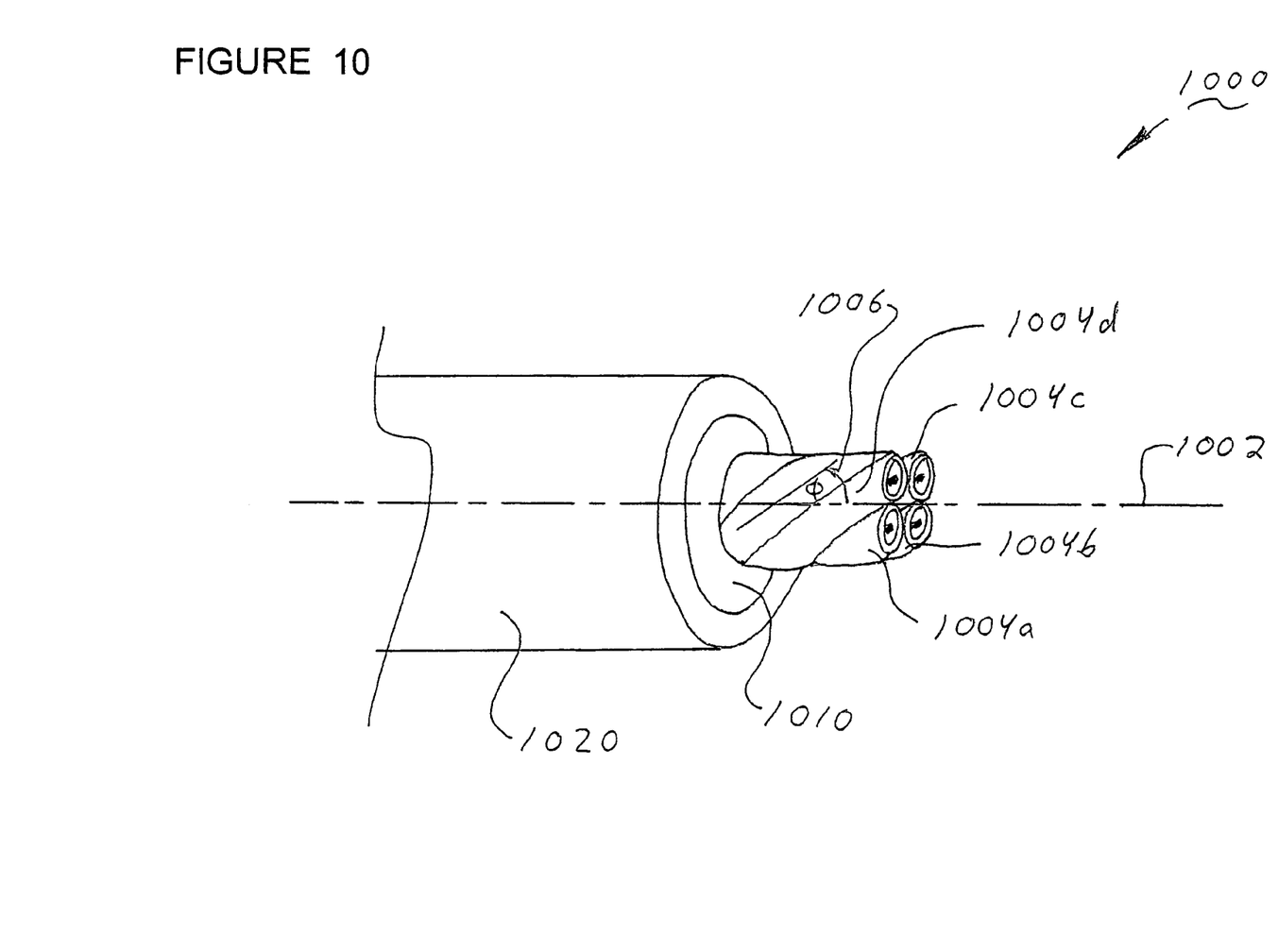
FIG. 10 illustrates another embodiment of a cable having an optical fiber wrapped at a non-zero wrap angle.

FIG. 10 illustrates another embodiment of a cable having an optical fiber wrapped at a non-zero wrap angle. With reference to FIG. 10, an isometric view of a cable is shown generally at 1000. A longitudinal axis of the cable is indicated at 1002. Relative to the longitudinal axis 1002 is a plurality of buffer tube assemblies wrapped at an angle $\Phi$ as indicated at 1006. The plurality of buffer tubes includes a buffer tube 1004a, 1004b, 1004c, and 1004d. A strength member 1010 is disposed over the plurality of buffer tubes, and a jacket 1020 is disposed over the strength member 1006. In various embodiments, as described above, the strength member and the jacket can be made from various materials and the embodiments of the invention are not limited by the materials used.

Appropriate optical fibers are selected for a given cable design, as shown in the figures above, based on such parameters as the cable diameter, the desired wrap angle, and the length of the cable with attention given to optical signal attenuation for a given cable design.

Figure 11:
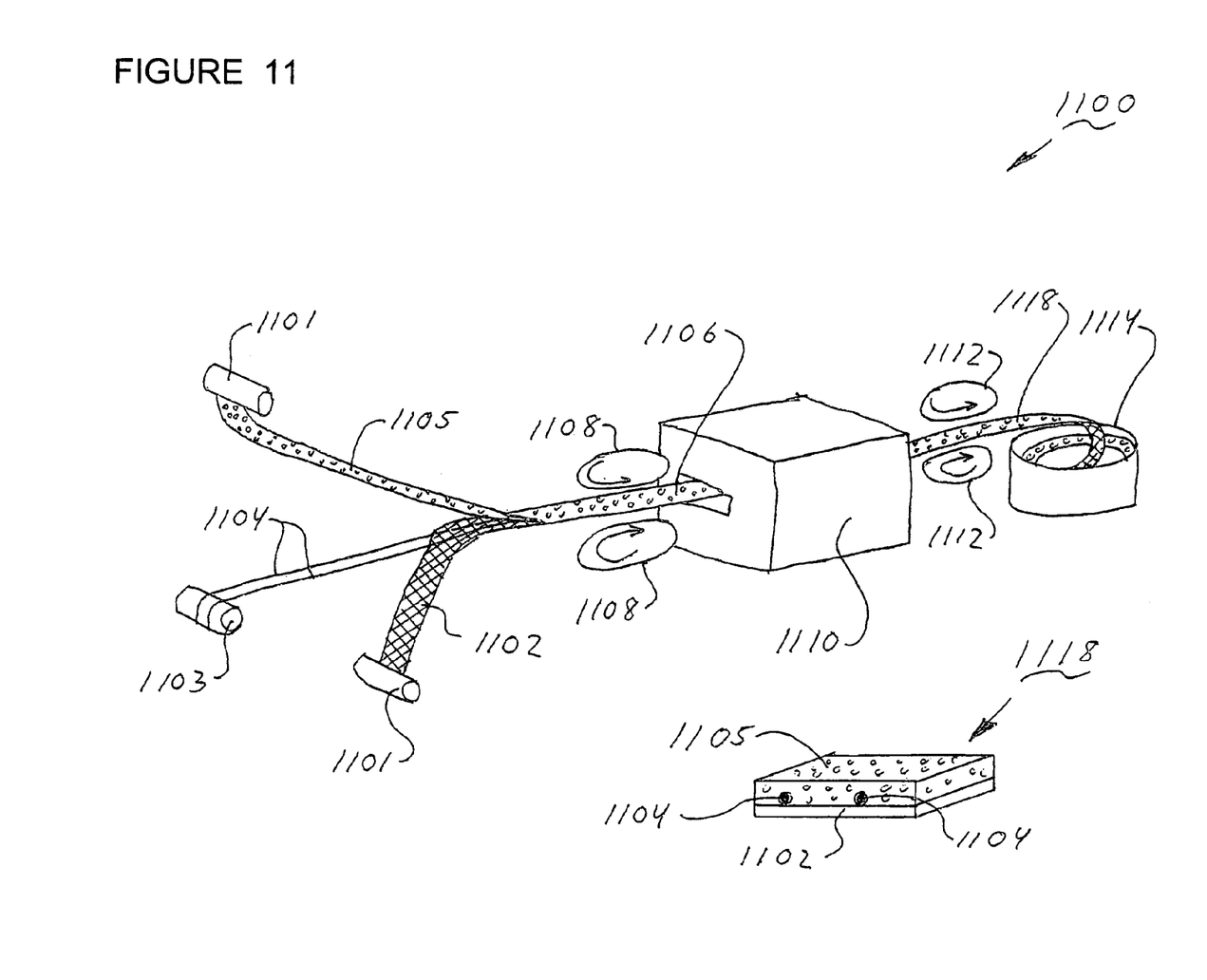
FIG. 11 shows an apparatus for creating excess fiber length according to one embodiment of the invention.

FIG. 11 shows an apparatus for creating excess fiber length according to one embodiment of the invention. With reference to FIG. 11, one or more buffer tube assemblies 1104 stream from spool 1103 or a plurality of spools, such as 1103, and are directed by appropriate guide mechanisms to meet a nylon backing layer 1102. The nylon backing layer 1102 can contain a layer of heat activated glue. An open cell foam layer 1105, the nylon backing layer 1102, and the buffer tube assemblies 1104, indicated at 1106, are merged together by mechanisms not shown and are fed by a traction mechanism 1008 and a traction mechanism 1112 into a heating device 1110. The traction mechanism 1112 working in unison with the traction mechanism 1108 moves the composite through the heating device 1110 at a rate of speed selected to allow the buffer tube assembly to experience an increase in temperature. Application of heat by the heating device 1110 allows a buffer tube to decrease in length; thereby creating excess fiber length within the buffer tube. The heat applied by heating device 1110 is analogous to the process described in conjunction with FIG. 3, block 304.

After leaving the heating device 1110, the composite 1118 is loosely coiled and cooled at 1114. The composite 1118 can be cooled by a variety of means such as exposure to a cold gas, immersion in a chilled liquid, immersion in an ice water bath, etc. The cooling process of 1114 is analogous to the process described in conjunction with FIG. 3, block 306.

In one embodiment, the composite passes through the heating device at a speed of two feet per minute. In one embodiment, the heating device raises the temperature of the composite to approximately 250 degrees Fahrenheit. In one embodiment it is convenient to use heat activated glue to fasten together the composite of nylon backing layer 1102, buffer tube assemblies 1104, and the open cell foam layer 1105.

A cross-sectional view of the composite is illustrated at 1118. A plurality of buffer tube assemblies 1104 are shown sandwiched between the nylon backing layer 1102 and the open cell foam layer 1105. In one embodiment, the nylon backing layer is made from rip-stop nylon, the buffer tube assemblies are made using PVDF for the buffer tube material, with high numerical aperture optical fiber, and the open cell foam is 40 pores per inch. Those of skill in the art will recognize that other materials can be substituted for the nylon backing layer 1102 and the open cell foam layer 1105.

A composite containing optical fiber buffer tube assemblies, such as the one described above, is used in one application, for connecting fiber optic sensors together within a sensor module. The sensor module can be used to make a towed array of fiber optic sensors that is used to detect sound traveling in a fluid such as water. Towed sonar arrays can be used for a seismic survey of the ocean subsurface, such as is performed in the course of oil exploration or for general underwater surveillance purposes. Extra optical fiber length incorporated into the buffer tube assemblies used in such sensor modules or in a vibration isolation module, used therewith, serves to lower the sensitivity of the optical system to unwanted environmentally induced strains (as described above in conjunction with FIG. 6); thereby, lowering unwanted phase noise.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.), etc.

As used in this description, "one embodiment" or "an embodiment" or similar phrases mean that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   incorporating a high numerical aperture (NA) optical fiber into a tube during a continuous process, wherein the tube has a first length, the tube contains the high NA optical fiber and a filler compound to create a buffer tube assembly;
   heating the buffer tube assembly to an elevated temperature for a period of time, wherein the first length of the tube decreases to a second length;
   creating extra optical fiber length, the extra optical fiber length is distributed substantially uniformly within the tube, as the tube decreases in length to the second length and the optical fiber moves radially through the filler compound to assume a curved shape within the tube; and cooling the buffer tube assembly, wherein the cooling stabilizes the second length to be shorter than a length of the high numerical aperture (NA) optical fiber that is contained within the tube.

2. The method of claim 1, wherein the heating is performed with hot water.

3. The method of claim 1, wherein the cooling is performed with cold water.

4. The method of claim 1, wherein the tube is made using a thermoplastic polyester elastomer, a polyvinylidene fluoride (PVDF), a plastic, or a thermoplastic.

5. The method of claim 4, wherein the PVDF is Atochem®#31508.

6. The method of claim 4, wherein the thermoplastic polyester elastomer is Hytrel®.

7. The method of claim 1, wherein the filler compound is a gel.

8. The method of claim 7, wherein the gel is made from a mixture of Cabosil and NyOil™.

9. The method of claim 1, wherein the incorporating is done during an extrusion process.

10. The method of claim 1, further comprising:
combining a cable component with the buffer tube assembly to form a cable, the cable component is selected from the group consisting of strength member, electrical conductor, and jacket wherein the excess optical fiber length, resulting from the creating, decreases a portion of a load, which can be borne by the high numerical aperture (NA) optical fiber, when the cable is loaded with the load.

11. The method of claim 1, wherein the excess optical fiber length, resulting from the creating, decreases a portion of a load, which can be borne by the high numerical aperture (NA) optical fiber, when the tube is loaded with the load.

12. A method comprising:
heating a buffer tube assembly to an elevated temperature, the buffer tube assembly contains an optical fiber, a filler compound, and a tube, wherein a length of the tube decreases from a first length to a second length;
creating extra optical fiber length, the extra optical fiber length is distributed substantially uniformly within the tube, as the tube decreases in length to the second length and the optical fiber moves radially through the filler compound to assume a curved shape within the tube; and
cooling the buffer tube assembly, wherein the cooling stabilizes the second length to be shorter than a length of the optical fiber that is contained within the tube.

13. The method of claim 12, wherein the heating utilizes a hot liquid.

14. The method of claim 13, wherein the hot liquid is water.

15. The method of claim 12, wherein the heating is performed with a gas.

16. The method of claim 12, wherein the heating is performed with an oven.

17. The method of claim 16, wherein the oven provides heat in a range of 200 degrees Fahrenheit to 250 degrees Fahrenheit.

18. The method of claim 12, wherein the cooling is performed with a cold fluid.

19. The method of claim 12, wherein the buffer tube assembly is cooled to at least 40 degrees Fahrenheit.

20. The method of claim 12, further comprising:
combining a cable component with the buffer tube assembly to form a cable, the cable component is selected from the group consisting of strength member, electrical conductor, and jacket wherein the excess optical fiber length, resulting from the creating, decreases a portion of a load, which can be borne by the optical fiber, when the cable is loaded with the load.

21. The method of claim 12, wherein the excess optical fiber length, resulting from the creating, decreases a portion of a load, which can be borne by the optical fiber, when the tube is loaded with the load.

22. The method of claim 12, wherein the optical fiber is a low bend loss optical fiber.

23. A method comprising:
heating a buffer tube assembly to an elevated temperature, the buffer tube assembly contains an optical fiber, a filler compound, and a tube, wherein a length of the tube decreases from a first length to a second length;
moving the optical fiber radially through the filler compound to assume a curved shape as the tube decreases in length to the second length during the heating;
creating extra optical fiber length, the extra optical fiber length is distributed along the tube's length during the moving, the extra optical fiber length is contained within the second length by the filler compound; and
cooling the buffer tube assembly, wherein the cooling stabilizes the second length to be shorter than a length of the optical fiber that is contained within the tube.

24. The method of claim 23, further comprising:
combining a cable component with the buffer tube assembly to form a cable, the cable component is selected from the group consisting of strength member, electrical conductor, and jacket wherein the extra optical fiber length, resulting from the creating, decreases a portion of a load, which can be borne by the optical fiber, when the cable is loaded with the load.

* * * * *